(12) United States Patent
Zhang et al.

(10) Patent No.: US 10,417,215 B2
(45) Date of Patent: Sep. 17, 2019

(54) DATA STORAGE OVER IMMUTABLE AND MUTABLE DATA STAGES

(71) Applicant: Hewlett Packard Enterprise Development LP, Houston, TX (US)

(72) Inventors: Huanchen Zhang, Palo Alto, CA (US); Kimberly Keeton, San Francisco, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 50 days.

(21) Appl. No.: 15/721,317

(22) Filed: Sep. 29, 2017

(65) Prior Publication Data

US 2019/0102416 A1    Apr. 4, 2019

(51) Int. Cl.
*G06F 12/00* (2006.01)
*G06F 16/23* (2019.01)
*G06F 3/06* (2006.01)
*G06F 9/52* (2006.01)
*G06F 13/16* (2006.01)

(52) U.S. Cl.
CPC .......... *G06F 16/2343* (2019.01); *G06F 3/067* (2013.01); *G06F 3/0619* (2013.01); *G06F 3/0622* (2013.01); *G06F 3/0637* (2013.01); *G06F 9/52* (2013.01); *G06F 9/522* (2013.01); *G06F 9/524* (2013.01); *G06F 9/526* (2013.01); *G06F 13/1663* (2013.01); *G06F 16/2365* (2019.01); *G06F 16/2379* (2019.01)

(58) Field of Classification Search
CPC ......... G06F 17/30362; G06F 17/30371; G06F 17/30377; G06F 3/0616; G06F 3/0622; G06F 3/0637; G06F 3/067; G06F 9/52; G06F 9/522; G06F 9/524; G06F 9/526; G06F 13/1663
See application file for complete search history.

(56) References Cited

U.S. PATENT DOCUMENTS

| 8,171,065 | B2 | 5/2012 | Slik et al. |
| 8,909,610 | B2 | 12/2014 | Reid et al. |
| 2003/0177320 | A1* | 9/2003 | Sah ...................... G06F 12/0813 711/158 |
| 2013/0268493 | A1 | 10/2013 | Berman et al. |

OTHER PUBLICATIONS

Kimura, H.; "FOEDUS: OLTP Engine for a Thousand Cores and NVRAM"; HP Laboratories, Apr. 21, 2015; < http://www.hpl.hp.com/techreports/2015/HPL-2015-37.pdf >, 17 pp.
Leung, A.W.; "Organizing, Indexing, and Searching Large-scale File Systems"; Dissertation—Doctor of Philosophy in Computer Science, University of California, Santa Cruz, Dec. 2009; < http://www.ssrc.ucsc.edu/papers/ssrctr-09-09.pdf >, 207 pp.

(Continued)

*Primary Examiner* — Shawn X Gu
(74) *Attorney, Agent, or Firm* — Michael A. Dryja

(57) ABSTRACT

A system includes processing nodes and shared memory. Each processing node includes a processor and local memory. The local memory of each processing node stores at least a partial copy of the immutable data stage of a dataset. The shared memory is accessible by each processing node and stores a sole copy of the mutable data stage of the dataset and a master copy of the immutable data stage of a dataset.

19 Claims, 4 Drawing Sheets

(56) References Cited

OTHER PUBLICATIONS

Stein, C.A. et al.; "Building a Reliable Mutable File System on Peer-to-peer Storage"; 2002; < https://pdfs.semanticscholar.org/b237/c09251218f9cb314b53a01ae55ce8c09f43c.pdf >, 6 pp.

Stender, J. et al.; "BabuDB: Fast and Efficient File System Metadata Storage"; 2010; < http://www.xtreemfs.org/publications/babudb-snapi.pdf >, 8 pp.

Zhou et al., "Dynamic Materialized Views", ICDE, 2007, pp. 526-535.

Zhang et al., "Reducing the Storage Overhead of Main—Memory OLTP Databases with Hybrid Indexes", Proceedings of the 2016 International Conference on Management of Data, 2016, pp. 1567-1581.

Westmann et al., "The implementation and performance of compressed databases", SIGMOD Rec., vol. 29, No. 3, Sep. 2000, pp. 55-67.

Stoica et al., "Identifying Hot and Cold Data in Main—Memory Databases", Proceedings of the 2013 IEEE International Conference on Data Engineering (ICDE 2013), 2013, pp. 26-37.

Stoica et al., "Enabling Efficient OS Paging for Main—Memory OLTP Databases", Proceedings of the Ninth International Workshop on Data Management on New Hardware, 2013, 7 pages.

Sikka et al., Efficient Transaction Processing in SAP HANA Database—The End of a Column Store Myth, Proceedings of the 2012 ACM SIGMOD International Conference on Management of Data, 2012, pp. 731-742.

Prokopec et al., "Concurrent tries with efficient non-blocking snapshots", Proceedings of the 17th ACM SIGPLAN symposium on Principles and Practice of Parallel Programming, 2012, 10 pages.

Oukid et al., FPTree: a hybrid SCM-DRAM persistent and concurrent B-tree for storage class memory, Proceedings of the 2016 International Conference on Management of Data, 2016, pp. 371-386.

O'Neil et al., "The log-structured merge-tree (lsm-tree)", Acta Inf., vol. 33, No. 4, Jun. 1996, pp. 351-385.

Muth et al., "The LHAM log-structured history data access method", The VLDB Journal—The International Journal on Very Large Data Bases, vol. 8, Issue 3-4, Feb. 2000, pp. 199-221.

Lim et al., "SILT: A Memory-Efficient, High-Performance Key-Value Store", To appear in Proceedings of the 23rd ACM Symposium on Operating Systems Principles (SOSP'11), 2011, pp. 1-13.

Larson et al., "SQL Server Column Store Indexes", SIGMOD, 2011, pp. 1177-1184.

Khandelwal et al., "BlowFish: Dynamic Storage-Performance Tradeoff in Data Stores", Proc. Symposium on Networked Systems Design and Implementation (NSDI), 2016, pp. 485-500.

H-Store, "Final Release", (webpage), available online at <http://hstore.cs.brown.edu/2016/06/final-release-june-2016/>, Jun. 3, 2016, 1 page.

Ghemawat et al., "LevelDB", (webpage), available online at <https://github.com/google/leveldb/tree/7fa20948d5a92d0e4b62486ed49e82814fa7bd6d>, Mar. 1, 2017, 4 pages.

Funke et al., "Compacting transactional data in hybrid OLTP &OLAP databases", Proceedings of the VLDB Endowment, vol. 5, Issue 11, Jul. 2012, pp. 1424-1435.

Farber et al., "SAP HANA database: data management for modern business applications", ACM SIGMOD, vol. 40, Issue 4, Jan. 2012, pp. 45-51.

Fan et al., "Cuckoo filter: Practically better than bloom", Proceedings of the 10th ACM International on Conference on emerging Networking Experiments and Technologies, 2014, 13 pages.

Eldawy et al., "Trekking through siberia: Managing cold data in a memory-optimized database", Proceedings of the VLDB Endowment, vol. 7 Issue 11, 2014, pp. 931-942.

DeBrabant et al., "Anti-caching: A new approach to database management system architecture", Proceedings of the VLDB Endowment, vol. 6, No. 14, 2013, pp. 1942-1953.

Chan et al., "Bitmap index design and evaluation", SIGMOD '98 Proceedings of the 1998 ACM SIGMOD international conference on Management of data, vol. 27, Issue 2, 1998, pp. 355-366.

Alexiou et al., "Adaptive range filters for cold data: Avoiding trips to siberia" Proceedings of the VLDB Endowment, vol. 6, No. 14, 2013, pp. 1714-1725.

Agarwal et al., "Succinct: Enabling Queries on Compressed Data", Proc. Symposium on Networked Systems Design and Implementation (NSDI), 2015, pp. 337-350.

"Mysql v5.5—how compression works for innodb tables", (webpage), available online at <https://web.archive.org/web/20170729195056/https://dev.mysql.com/doc/refman/5.5/en/innodb-compression-internals.html>, Jul. 29, 2017, 5 pages.

* cited by examiner

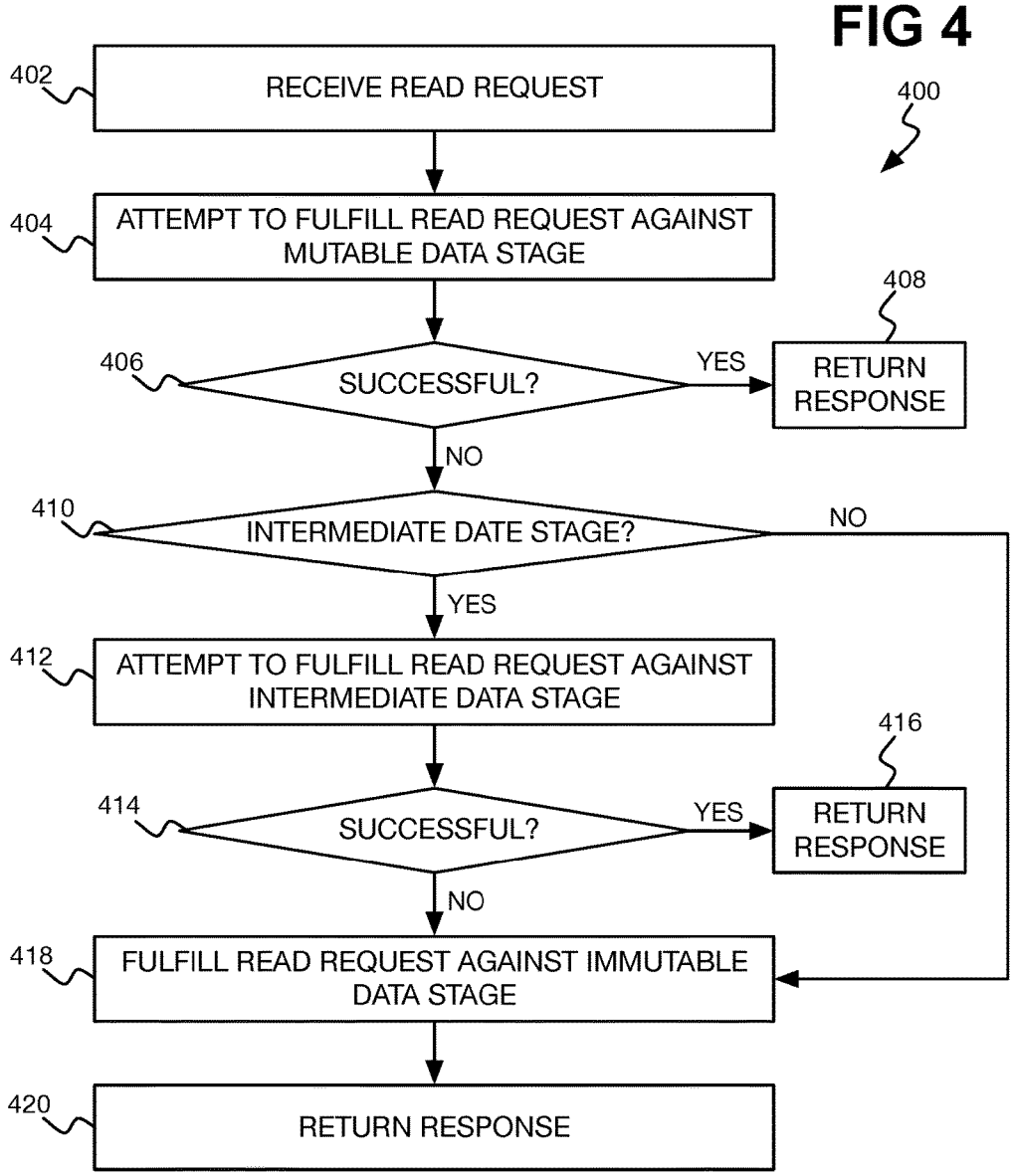

DATA STORAGE OVER IMMUTABLE AND MUTABLE DATA STAGES

BACKGROUND

As computing technology has evolved and become more ingrained in modern life, the amount of data that is generated and correspondingly later retrieved for analysis and other reasons is of a scope that can quickly defy human comprehension. The Library of Congress, for instance, has been estimated to hold fifteen terabytes of data, which a small number of off-the-shelf readily available hard disk drives can easily store. Yet, enterprise systems, if not already commonplace, are now being constructed that contemplate the storage of petabytes of data. A single petabyte is equal to 1,024 terabytes, or more than six-eighty times the amount of information that the Library of Congress stores.

In such enterprise systems, typical access patterns are that updates are more common for new data, but as the data ages over time, the data is less likely to be updated. By comparison, read accesses may occur with about the same relative frequency for both new data (e.g., to understand what has happened recently) and for older data (e.g., for historical analysis purposes). Retrieval of data may exponentially slow as the amount of stored data increases. Furthermore, coordination issues become more difficult to manage with increasing amounts of data and increasing numbers of processing nodes that can access the data.

BRIEF DESCRIPTION OF THE DRAWINGS

FIG. 3 is a flowchart of an example method for performing a write request against a dataset that is stored over immutable and mutable stages.

FIG. 4 is a flowchart of an example method for performing a read request against a dataset that is stored over immutable and mutable stages.

DETAILED DESCRIPTION

Figure 1:
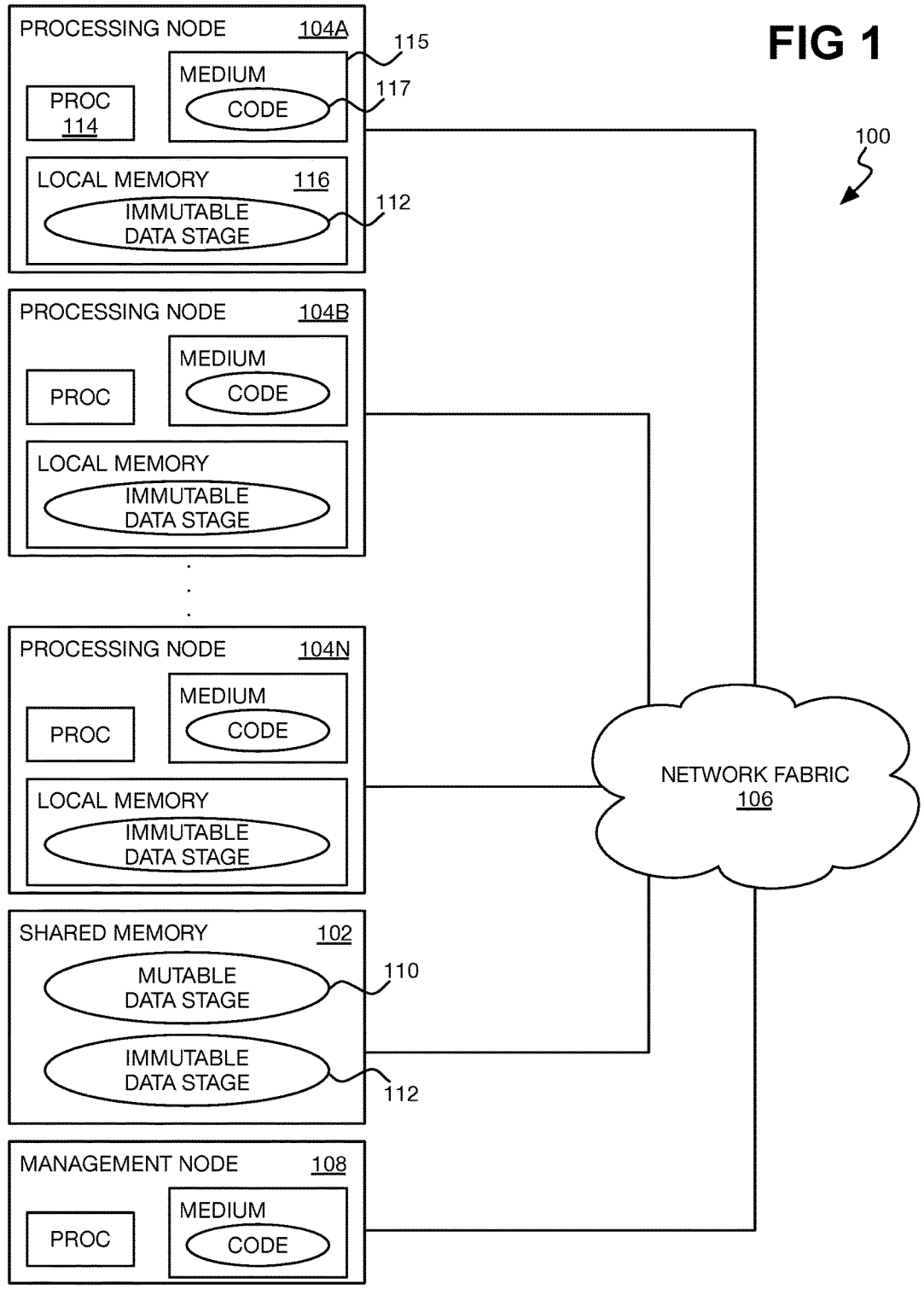
FIG. 1 is a diagram of an example data storage and retrieval architecture for a dataset that is stored over immutable and mutable stages.

Disclosed herein are techniques that provide for storage and retrieval of data by multiple end processing nodes, and which can scale to amounts of data on the order of petabytes or more. Based on expected access patterns, the data store is organized into a mutable stage and an immutable stage. The mutable stage can be changed or modified, whereas the immutable stage cannot be modified. Data that is recently created or modified is considered "hot" data, and enters the data store as part of the mutable stage. The mutable stage can change or be modified. Over time, the data "cools" and updates become less frequent. This "cold" data is transitioned to an immutable stage. The immutable stage cannot change or be modified, except by the supersession of new data in the mutable stage.

Non-volatile shared memory stores a sole copy of the mutable data stage. A number of processing nodes each include volatile local memory, which can store a copy of at least a portion of the immutable data stage; a master copy of the immutable data stage in its entirety is stored on the non-volatile shared memory as well. Each processing node has access to the shared memory, but can typically access its local memory much more quickly than it can the shared memory.

For example, the processing node accesses its local memory more quickly because the local memory is part of the processing node itself, whereas the shared memory is no. Instead, the shared memory is external to the processing node, and has to be accessed over a fabric interconnecting the processing node to the shared memory, which introduces access delay as compared to local memory access. As such, each processing node accesses data more quickly from its local memory than from the shared memory.

The size of the immutable data stage over time is much larger than the size of the mutable data stage. Furthermore, the immutable data stage is stored in a more space-efficient manner than the mutable data stage. That is, for a given amount of data, the immutable data stage occupies less storage space than the mutable data stage.

Such a data storage and retrieval architecture has proven to scale well to large amounts of data accessible by multiple processing nodes. The architecture is unintuitive in that the faster memory—the local memory of each node—caches the older immutable data stage that contains cold data, whereas the slower memory—the shared memory—stores the newer mutable data stage with data that is hot and more likely to be updated. Nevertheless, because just the mutable data stage has to have synchronized access thereto by the processing nodes, so that no coherency issues occur, the architecture scales well to large amounts of data.

Each of the processing nodes has its own copy of the immutable data stage to which synchronized access is unnecessary. The greater space efficiency at which the immutable data stage is stored may result in the entirety of this stage being cached in each node's local memory. This is the case even though the amount of local memory at each node is usually orders of magnitude smaller than the amount of shared memory.

FIG. 1 shows an example data storage and retrieval architecture 100. The architecture 100 includes shared memory 102 accessible by each of a number of processing nodes 104A, 104B, . . . , 104N, which are collectively referred to as the processing nodes 104. The shared memory 102 is non-volatile memory, and may be fabric-attached to provide greater scalability. Examples of such fabric-attached memory (FAM) can include non-volatile memory stored in conjunction with the Gen-Z and Omni-Path fabrics, remote direct memory access (RDMA) memory, and so on. Non-volatile memory as used herein can mean phase-change memory (PCM), resistive random-access memory (ReRAM), and other persistent memory that is cache line-addressable, as opposed to solid-state drives (SSDs) and other types of block-addressable memory. Each processing node 104 may be a computing device, like a server or client computing device or another type of computing device. In this respect, a computing device can be or include a system on a chip (SoC).

A network fabric 106 interconnects the shared memory 102 to the processing nodes 104. The network fabric 106 can be a Gen-Z or an Omni-Path fabric. The network fabric 106 may also be a fibre channel (FC) network fabric, a peripheral component interconnect (PCI) express (PCIe) network fabric, or another type of network fabric. A separate management node 108 may also be able to access the shared memory 102 via connection to the network fabric 106. In another implementation, one of the processing nodes 104 may function as the management node 108; that is, one of the processing nodes 104 may instead also be the management node 108. The management node 108 may also in one implementation interconnect the shared memory 102 to the network fabric 106, instead of the shared memory 102 and the management node 108 each directly connecting to the fabric 106.

The shared memory 102 stores a sole copy of the mutable data stage 110 of a dataset that the data storage and retrieval architecture 100 manages. The shared memory 102 stores a master copy of the immutable data stage 112 of the dataset. As to the processing nodes 104, the processing node 104A is referenced in detail in FIG. 1 as representative of each of the processing nodes 104 (as well as the management node 108). Each processing node 104 thus includes a processor 114, a non-transitory computer-readable data storage medium 115, and local memory 116. The medium 115 may store program code 117 that the processor 114 can execute. The local memory 116 of each processing node 104 stores a local copy of the immutable data stage 112 of the dataset.

As noted above, the immutable data stage 112 can include cold data of the dataset that is not changeable, whereas the mutable data stage 110 can include hot data of the dataset that is changeable until the mutable data stage 110 itself becomes immutable. Over time, the size of the immutable data stage 112 can grow in size to become much larger than the size of the mutable data stage 110, especially since periodically the mutable data stage 110 becomes part of the immutable data stage 112. Each processing node 104 accesses the immutable data stage 112 as cached within its own local memory 116, whereas each processing node 104 accesses the mutable data stage 110 from the memory 102 shared among the processing nodes 104.

Each processing node 104 can access its own local memory 116 more quickly than it can the shared memory 102. Therefore, each processing node 104 can access the immutable data stage 112 cached within its own local memory 116 more quickly than it can the mutable data stage 110 stored within the shared memory 102. Furthermore, the local memory 116 of a processing node 104 may be able to be accessed just by that processing node 104, and not by any other processing node 104.

Because the immutable data stage 112 is not changeable, each processing node 104 can access the immutable data stage 112 as stored on its own local memory 116 without coordination with other processing nodes 104. That is, the immutable data stage 112 stores read-only data. Therefore, a processing node 104 does not have to worry that the copy of the immutable data stage 112 stored within its own local memory 116 is no longer valid (i.e., up-to-date), since the data within the immutable data stage 112 cannot be changed by another node 104.

By comparison, the mutable data stage 110 is changeable. Therefore, access to the mutable data stage 110 by the processing nodes 104 has to be coordinated so that one processing node 104 is not reading a part of the data within the mutable data stage 110 at the same time that another node 104 is overwriting or updating that part of the data within the stage 110. However, because there is just one logical copy of the mutable data stage 110, on the shared memory 102, such coordination does not require (multiple-node) coherency, as would be necessary if each processing node 104 stored its own copy of the mutable data stage 110; rather, just concurrency control techniques are employed. (It is noted that there is one copy of the mutable data stage 110 in the sense that there is one logical copy of the data within this stage 110, but this copy can be stored in conjunction with fault-tolerance redundancy schemes.)

The shared memory 102 stores a sole copy of the mutable data stage 110 and a master copy of the immutable data stage 112, and copies of the immutable data stage 112 are stored in the local memories 116 of the processing nodes 104. Storage of the mutable data stage 110 within the shared memory 102 means that updates of the mutable data stage 110 can occur without explicit coherence among the processing nodes 104. The immutable data stage 112 can be easily cached in multiple local memories 116, because the data within this stage 112 cannot be changed.

In one implementation, the mutable data stage 110 is stored within the shared memory 102 within a lock-free concurrent radix tree, although other types of lock-free concurrent data structures, such as hash tables, may be employed. A radix tree is a space-optimized tree data structure, in which the number of children of every internal node is at least the radix r of the radix tree. The radix r is a positive integer and a power of two. Unlike other trees, the edges of a radix tree can be labeled with sequences of elements as well as single elements. This attribute of radix trees make them more efficient for storing small sets of strings, as well for sets of strings that share long prefixes.

Radix trees are particularly scalable, for at least two reasons. First, unlike B-trees and other such search trees, the search complexity of a radix tree is a function of the length of the search key, instead of a function of the logarithm of the number the tree's entries. This ensures scalability, since with increasing data, the length of the search key tends to remain constant while the number of entries linearly increases. Second, modifications, such as insert, update, and delete operations, on a radix tree can be performed in a highly localized manner, with minimal structural changes like node splits. This ensures scalability, because lock-free atomic operations may be employed instead of locks.

In this respect, it is noted that the usage of fine-grained memory semantic fabrics enables the usage of lock-free concurrent data structures such as radix trees. This is because such data structures can be efficiently updated, using fine-grained, such as cache line-sized, updates, rather than as input/output (I/O) using large updates (such as four kilobyte blocks). Furthermore, updates to the data structure can be atomically added using atomic primitives provided by the fabric, which I/O networks generally do not provide.

The mutable data stage 110 can also be stored within the shared memory 102 with filters to accelerate searching of the data 110. Such filters can include Bloom filters. However, because Bloom filters do not support delete operations and range scan searching, other types of filters can also be employed, such as Cuckoo filters.

As noted above, a sole copy of the mutable data stage 110 is stored within the shared memory 102. This permits access to the mutable data stage 110 by all the processing nodes 104, without the need for distributed locking like two-phase locking, or distributed commit protocols like two-phase commit protocols. However, portions of the mutable data stage 110 that are older, and which are less likely to change, may also be cached in the local memory 116 of each processing node 104 to increase performance in some implementations. In this case, coherency among the copies stored within the local memories 116 of the processing nodes 104 may have to be maintained.

In one implementation, the immutable data stage 112 is stored with a compressed row-store format that employs an entropy-encoding scheme. Encoding may be applied at the attribute level of the data, with a dictionary constructed for each attribute by sorting distinct values for the attribute based on their frequency of occurrence. The encoded values, or codes, are array indices that are implicitly stored. Such dictionary construction encodes frequent values with fewer bits to achieve a high compression rate. The number of occurrences, or other sets of aggregates, for each unique value of each attribute may also be stored, for optimizing aggregation-based analytic queries.

The compressed immutable data stage 112 can be contiguously cached within the local memory 116 of each processing node 104 in fixed size data blocks, which may be cache lines that are smaller than 512 bytes in size. Because the encoded values have variable lengths, a header structure may be employed to denote the identifier and length of the encoded value for each attribute, so that the compressed data can be tokenized and decoded using the dictionaries. Decoding can occur quickly, for at least two reasons. First, decoding an attribute value involves just one array lookup since the code is the same as the array index within the dictionary. Second, because of the header structure, decoding multiple attribute fields can occur in parallel, unlike in Huffman encoding, for instance.

Space-efficient indices may also be stored with the compressed immutable data stage 112 to optimize searching of the immutable data. A primary index can map object names to record address within the data blocks. Attribute indices map attribute values not just to record addresses but also to corresponding dictionary entries.

In general, then, in the example architecture 100 of FIG. 1, the shared memory 102 stores the mutable data stage 110 of a dataset and a master copy of the immutable data stage 112, and the local memory 116 of each processing node 104 stores a copy of the immutable data 112 of a dataset. The dataset can be metadata regarding other data (i.e., "data regarding data"). The shared memory 102 specifically stores an only or sole copy of the mutable data stage 110; that is, in some implementations, the local memory 116 of any processing node 104 may not store or even cache the mutable data stage 110. The shared memory 102 can also store a master copy of the immutable data stage 112, which is cached at least in part if not completely at the local memory 116 of each processing node 104. The immutable data stage 112 can be cached within the local memory 116 of each processing node 104 in a more space-efficient manner than the sole copy of the mutable data stage 110 stored within the shared memory 102.

Writing to and reading from the dataset stored over the mutable data stage 112 and the immutable data stage 112, as well as updating data stored in the immutable data stage 112 using the mutable data stage 110 are now generally described before a more specific description of each process is provided. In general, writing of new data by any processing node 104 is performed in relation to the mutable data stage 110 stored on the shared memory 102. If a processing node 104 is to update or overwrite (or delete) data that resides in the existing immutable data stage 112, the processing node 104 still writes new data to the mutable data stage 110 of the shared memory 102, with a reference to the immutable data stage 112 that is no longer valid. That is, the immutable data stage 112 itself remains unchanged. The writing process is described in more detail later in the detailed description.

In general, reading of data within the dataset by any processing node 104 is performed first in relation to the mutable data stage 110 stored on the shared memory 102, and then in relation to the immutable data stage 112 cached in the local memory 116 of the processing node 104 in question. If the processing node 104 only caches a portion of the immutable data stage 112, the processing node 104 reads from the master copy of the immutable data stage 112 in the shared memory 102. If a query can be satisfied just by the mutable data stage 110, then the processing node 104 does not have to access the immutable data stage 112. If querying the mutable data stage 110 does not fully satisfy the query, however, then the immutable data stage 112 cached in the local memory 116 of the processing node 104 in question can also be accessed. If the processing node 104 caches just a portion of the immutable data stage 112 and this portion does not fully satisfy the query, then the processing node 104 can access the immutable data stage 112 in shared memory 102. If the processing node 104 caches the entire immutable data stage 112, then there is no need to access the master copy in the shared memory 102. The reading process is described in more detail later in the detailed description.

In general, the existing mutable data stage 110 is periodically processed to become part of the immutable data stage 112, by the management node 108. Once the management node 108 performs this process, at least the new portions of the immutable data stage 112 are written to the shared memory 102 and provided to each processing node 104 for caching at its local memory 116. A new mutable data stage 110 may then be generated by the processing nodes 104, which will also later become part of the immutable data stage 112. The updating process is described in more detail later in the detailed description.

Figure 2A:
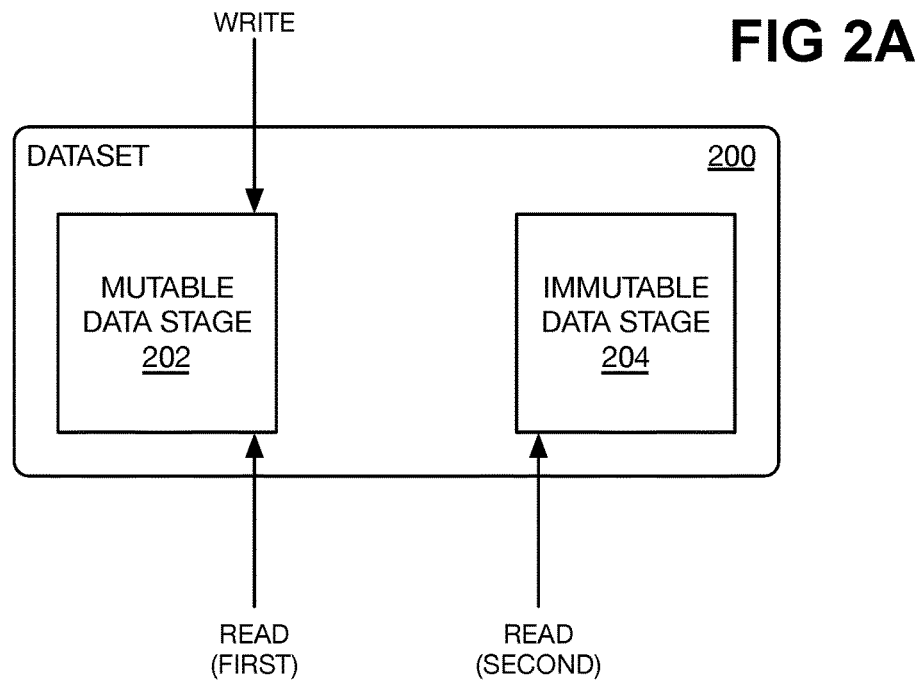
FIGS. 2A and 2B are diagrams of an example dataset stored over immutable and mutable data stages.

FIG. 2A shows an example dataset 200 during regular processing. The dataset 200 includes recently updated data within a mutable data stage 202, and previously updated data within an immutable data stage 204. As noted above, the mutable data stage 202 can be stored within shared memory accessible by every processing node, whereas the immutable data stage 204 can be cached within local memory of each processing node.

When a processing node is to perform a write request to the dataset 200, the node specifically fulfills the write request by writing just to the mutable data stage 202 stored by the shared memory, and not to the copy of the immutable data stage 204 stored by the local memory of any processing node (including itself) or the shared memory. By comparison, when a processing node is to perform a read request, such as a search query, of the dataset 200, the node attempts to fulfill the read request by searching the sole copy of the mutable data stage 202 stored by the shared memory. If the request cannot be fulfilled by referring just to the mutable data stage 202, the processing node attempts to fulfill the read request by searching the copy of the immutable data stage 204 stored within the node's local memory. If the processing node 104 caches just a portion of the immutable data stage 112 and this portion does not fully satisfy the query, then the processing node 104 fulfills the read request by searching the immutable data stage 112 in shared memory 102. If the processing node 104 caches the entire immutable data stage 112, then the read request is fulfilled by the cached copy.

Figure 2B:
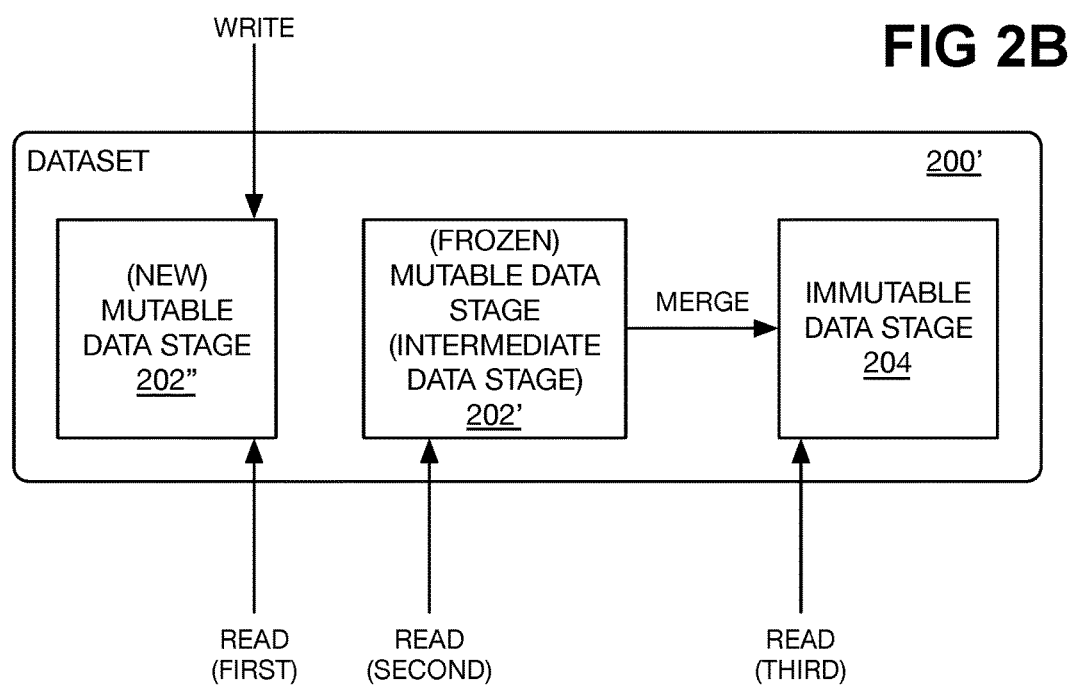

FIG. 2B shows the example dataset 200, as the dataset 200', when the mutable data stage 202 is ready to be merged with the immutable data stage 204 of FIG. 2A. That is, FIG. 2B shows the example dataset 200' when the immutable data stage 204 of FIG. 2A is ready to be updated with the mutable data stage 202. The mutable data stage 202 of FIG. 2A is frozen to become an intermediate data stage 202'. A management node then processes this intermediate data stage 202' so that data is in the same format as the immutable data stage 204. As the management node processes the intermediate data stage 202' to be in this same format as the immutable data stage 204, the management node can add the processed intermediate data stage 202' to the immutable data stage 204.

Subsequent write requests by processing nodes upon freezing of the mutable data stage 202 of FIG. 2A to realize the intermediate data stage 202' of FIG. 2B are fulfilled by writing to a new mutable data stage 202". The new mutable data stage 202" is stored within the shared memory accessible by every processing node. Read requests by processing nodes are first attempted to be fulfilled against the new mutable data stage 202", if any data has been stored in this stage 202" already. If the read requests cannot be completely fulfilled against the new mutable data stage 202", they are attempted to be fulfilled next against the intermediate data stage 202'. If the read requests still cannot be completely filled against the intermediate data stage 202', they are fulfilled against the immutable data stage 204. After the intermediate data stage 202' has been completely merged with the immutable data stage 204, then the intermediate data stage 202' does not have to be consulted, since it is now part of the (updated or new) immutable data stage 204.

In one implementation, as the management node processes the intermediate data stage 202', it sends the processed intermediate data stage 202' to each processing node. As such, each processing node updates its cached copy of the immutable data stage 204 within its local memory, as the node receives the processed intermediate data stage 202' from the management node. In this implementation, the management node also updates a master copy of the immutable data stage 204 stored in the shared memory as the management node processes the intermediate data stage 202'. This approach is workable specifically where the processed intermediate data stage 202' is appended to the immutable data stage 204.

In another implementation, the management node first completely processes the intermediate data stage 202' stored within the shared memory 102 and then updates the immutable data stage 204. This process can include merging the intermediate data stage 202' with the immutable data stage 204, where some of the immutable data stage 204 is itself modified or deleted while merging the intermediate data stage 202' therewith. In this implementation, once the immutable data stage 204 has been updated in the shared memory, the management node can send the updated immutable data stage 204 to each processing node so that every processing node can replace its copy of the immutable data stage 204 with the updated immutable data stage 204.

In either implementation, once the intermediate data stage 202' has been completely added to or merged with the immutable data stage 204, the intermediate data stage 202' ceases to exist, and read and write requests occur as has been described in relation to FIG. 2A. Furthermore, in either implementation, the immutable data stage 204 may be (periodically) reprocessed in its entirety. This can ensure further spatial efficiency in how the immutable data stage 204 is stored.

FIG. 3 shows an example method 300 for processing a write request against a dataset stored over mutable and immutable data stages. The method 300 can be performed by a processing node. The method 300 can be implemented as program code stored on a non-transitory computer-readable data storage medium and executable by a processor, such as a processor of a processing node.

The processing node receives a write request (302). For instance, the write request may be received by an application computer program running on the processing node. The write request may be a request to write new data, update or overwrite existing data, or delete existing data. The processing node fulfills the write request against the dataset as stored in the mutable data stage stored in shared memory (304), which is accessible to this processing node (as well as to the other processing nodes). That is, the processing node does not fulfill the write request against the dataset as stored in the immutable data stage cached in the local memory of the processing node.

It is noted that although the immutable data stage cannot be changed, the data stored in this data stage can be effectively updated by writing updates to the mutable data stage in the shared memory, which supersedes the older (immutable) copy of the data stored in the immutable data stage. For example, an employee named Alice Smith may have moved from location A to location B. The data indicating that Alice Smith's location is location A may be stored as part of the immutable data stage. Therefore, the immutable data stage, as stored in the local copy of each processing node and in the shared memory, cannot be changed, since it is not changeable. However, new data indicating that Alice Smith's location is location B may be stored in the mutable data stage within shared memory. To effect this, the data record in question may have an identifier, and this data record may be referred to by its identifier as stored in the immutable data stage when the record is updated in the mutable data stage within the shared memory.

FIG. 4 shows an example method 400 for processing a read request against a dataset including mutable and immutable data stages. The method 400 can also be performed by a processing node. The method 400, like the method 300, can be implemented as program code stored on a non-transitory computer-readable data storage medium and executable by a processor, such as a processor of a processing node.

The processing node receives a read request (402). For instance, the read request may be received by an application computer program running on the processing node. The read request can be considered a search query, in that the request asks for a particular value of a data record of the dataset, or for information regarding potentially more than one data record of the dataset. For example, if the dataset concerns an enterprise's employees and stores information regarding each employee, a request for a particular value of a data record may be a request for the position or title of a particular employee. As another example, a request for information regarding potentially more than one data record of the dataset may be a request for the number of employees in a particular department, such as human resources.

The processing node attempts to fulfill the read request against the mutable data stage stored in shared memory accessible by the processing node performing the method 400 and other processing nodes (404). If this attempt is successful (406), then the processing node can return a response to the initiator of the read request (408). The attempt to fulfill the read request of part 404 is considered successful in part 406 if the request can be completely fulfilled by referring just to the mutable data stage stored in shared memory. For example, a request for a particular attribute of a data record can be completely fulfilled by referring just to the mutable data stage if the data record's attribute is present within the mutable data stage.

However, a request for information regarding potentially more than one data record of the dataset (or more than one attribute of a data record) cannot be completely fulfilled by referring just to the mutable data stage if there are relevant data records (or attributes) within the immutable data stage. For example, a request for the number of employees in a particular department may result in a number of relevant records being found in the mutable data stage. However, this does not mean that there are not other relevant records in the immutable data stage, and as such this request cannot be fulfilled against just the mutable data stage.

Therefore, if the attempt to (completely) fulfill the read request against the mutable data stage stored in shared memory is unsuccessful (406), and there is currently an intermediate data stage in which data of an earlier mutable data stage has been frozen and that is being processed to update the immutable data stage (410), then the processing node attempts to fulfill the read request against the intermediate data stage stored in the shared memory (412). If this attempt is successful (414), then the processing node can return a response to the initiator of the read request (416). As described above with respect to the attempt to fulfill the read request of part 404, the attempt to fulfill the read request of part 412 is considered successful in part 414 if the request has been completely fulfilled after referring to the intermediate data stage stored in the shared memory. It is noted that if processing of the intermediate data stage to update the immutable data stage is occurring slowly, additional mutable data stages may have subsequently been frozen (i.e., there may be more than one intermediate data stage). As such, in part 412, multiple intermediate data stages may have to be examined in a looped manner, until all such intermediate data stages have been consulted.

If the attempt to (completely) fulfill the read request against the intermediate data stage stored in shared memory in part 412 is unsuccessful (414), or if there is currently no intermediate data stage (410), then the processing node fulfills the read request against the immutable data stage (418). As described earlier, the processing node will first consult the immutable data stage cached in local memory of the node. If the node has cached a complete copy of the immutable data stage, then the request is fulfilled by the cached copy. If the node only caches a portion of the immutable data stage, then the node also consults the master copy of the immutable data stage stored in the shared memory to fulfill the request. The processing node then returns a response to the initiator of the read request (420). The read request is considered fulfilled (i.e., completed) once the request has been attempted against the complete immutable data stage, because the dataset is stored over no other data stages. This does not mean, however, that the read request is considered successful. For example, a request for a particular value of a data record like a request for the position or title of a particular employee can be unsuccessful but still fulfilled if no such data record exists in the mutable data stage, the intermediate data stage (if present), and the immutable data stage.

As another example, a request for information regarding potentially more than one data record of the dataset like a request for the number of employees in a particular department, such as human resources, may have to be attempted against each of the mutable data stage, the intermediate data stage (if present), and the immutable data stage to be considered fulfilled. The number of such employees may be zero if no such data records exist in any of these stages, but the search request is still considered fulfilled (i.e., completed). Even if data records for two such employees, for instance, are located in the mutable data stage, the search request is not considered fulfilled until the immutable data stage is also examined for further data records, even if no such data records exist in the immutable data stage.

Figure 5:
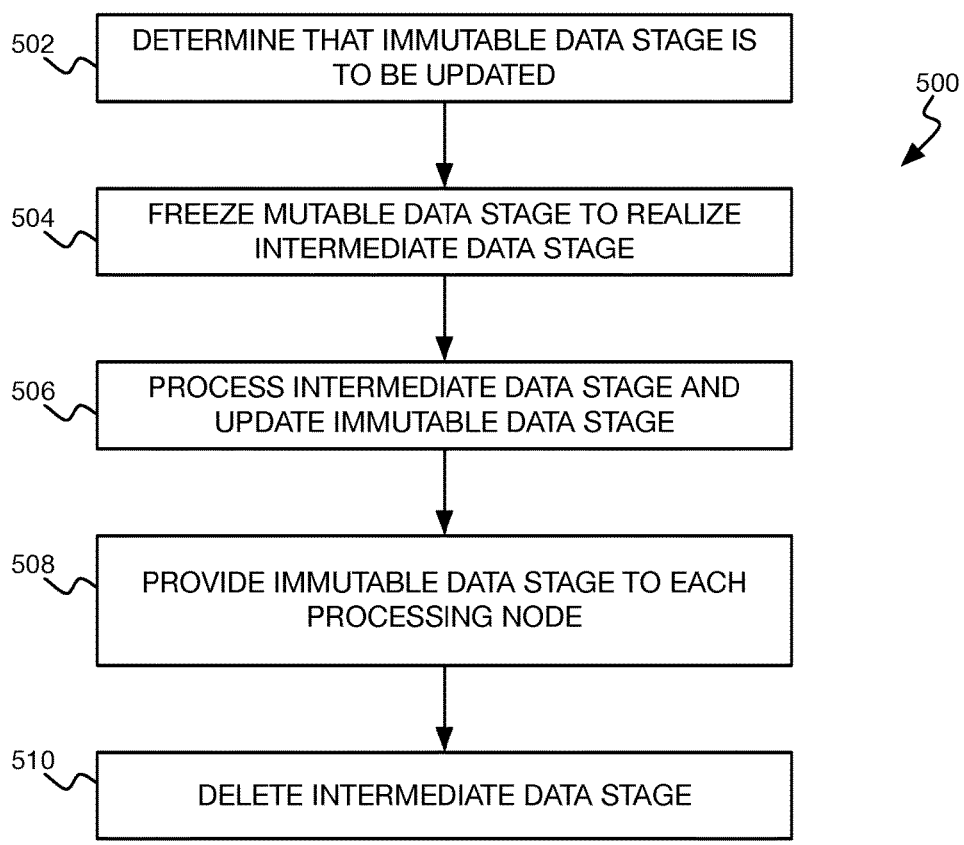
FIG. 5 is a flowchart of an example method for updating an immutable data stage with data from a mutable data stage.

FIG. 5 shows an example method 500 for merging the mutable data stage of a dataset with the immutable data stage of the dataset. That is, the method 500 updates the immutable data stage of a dataset with the mutable data stage of the dataset. The method 500 can be performed by a management node. Like the methods 300 and 400, the method 500 can be implemented as program code stored on a non-transitory computer-readable data storage medium and executable by a processor, such as a processor of a management node.

The management node determines that the mutable data stage stored in shared memory accessible by processing nodes (as well as the management node) is to be merged with the immutable data stage stored in the shared memory, a copy of which may also be stored in the local memory of each processing node (502). For instance, the amount of space reserved in the shared memory for storing the mutable data stage may be running low, such that the mutable data stage is to be merged with the immutable data stage. As another example, the immutable data stage may be updated with the mutable data stage at given time intervals. As a third example, the immutable data stage may be updated with the mutable data stage when the ratio between the mutable data stage and the immutable data stage exceeds a threshold.

In response, the management node freezes the mutable data stage (504) to realize an intermediate data stage to which no additional modifications can be made. As noted above, subsequent write requests are processed against a new mutable data stage, and not to the mutable data stage that has been frozen to become the intermediate data stage. The management node then processes the intermediate data stage and updates the immutable data stage with the processed intermediate data stage (506). The mutable data stage when frozen as the intermediate data stage is stored in a different format than the immutable data stage. Therefore, the management node processes the intermediate data stage so that it is in the same format as the immutable data stage, resulting in a new or updated immutable data stage.

The management node may store a master copy of the immutable data stage, as updated with the processed intermediate data stage, within shared memory. The management node can also provide the new or updated immutable data stage to each processing node (508), so that, for instance, in one implementation the processing nodes can replace the immutable data stage cached in their local memories with the newly provided immutable data stage. The management node can then delete the intermediate data stage (510).

The method 500 presumes that once the mutable data stage has been frozen as the intermediate data stage and then effectively merged into the immutable data stage, there may be no further need to modify the resulting immutable data stage except to add subsequent frozen mutable data stages (i.e., subsequent intermediate data stages) after they have been processed. However, over time, the repeated additions to the immutable data stage may result in the immutable data stage being stored in a non-optimal manner as compared to the first time the mutable data stage was frozen and processed and the immutable data stage then updated. Therefore, periodically the management node may also reprocess the immutable data stage in its entirety, to ensure further spatial efficiency as to how the immutable data stage is stored.

The techniques that have been described herein permit the storage and access of data in a manner that scales well even with very large amounts of such data. Specifically, actively updated hot data is stored within shared memory in a mutable data stage, so that every processing node can access such mutable data without having to enforce coherence. Furthermore, inactively updated cold data becomes immutable. Due to its immutable nature, this data stage can be cached in the local memory of every processing node in an immutable data stage, and coordination among the nodes is unnecessary for access to the immutable data stage since it includes just read-only data.

We claim:

1. A system comprising:
   a plurality of processing nodes, each processing node comprising a processor and local memory, the local memory of each processing node storing at least a partial copy of an immutable data stage of a dataset; and
   shared memory accessible by each processing node and storing a sole copy of a mutable data stage of the dataset and a master copy of the immutable data stage of the dataset.

2. The system of claim 1, wherein the immutable data stage stores actively read data of the dataset, and the mutable data stage stores actively read and actively updated data of the dataset.

3. The system of claim 1, wherein the immutable data stage stores a given amount of data in less space than the mutable data stage does.

4. The system of claim 3, wherein the mutable data stage is stored within a lock-free concurrent radix tree, and
   wherein the immutable data stage is stored in a compressed manner using an entropy-encoding scheme.

5. The system of claim 1, wherein the local memory of each processing node is accessible just by the processing node, and
   wherein each processing node accesses data more quickly from the local memory thereof than from the shared memory.

6. The system of claim 5, wherein the local memory of each processing node comprises dynamic random-access memory (DRAM), and the shared memory comprises fabric-attached non-volatile memory (FANVM).

7. The system of claim 1, wherein each processing node is to perform a read request by:
   attempting to fulfill the read request by searching the mutable data stage stored by the shared memory; and
   in response to the mutable data stage not fulfilling the read request, fulfilling the read request by searching the immutable data stage as at least partially cached in the local memory of the processing node; and
   in response to the immutable data stage as at least partially cached not fulfilling the read request, fulfilling the read request by searching the immutable data stage as completely stored in the shared memory.

8. The system of claim 1, wherein each processing node is to perform a write request by:
   fulfilling the write request by writing just to the mutable data stage and not to the immutable data stage.

9. The system of claim 1, further comprising:
   a management node to periodically update the immutable data stage with the mutable data stage stored in the shared memory since a last update of the immutable data stage.

10. The system of claim 9, wherein the management node is to periodically update the immutable data stage with the mutable data stage by:
    freezing the mutable data stage as an intermediate data stage;
    processing the intermediate data stage;
    updating the immutable data stage stored in the shared memory with the processed intermediate data stage;
    providing the updated immutable data stage to each processing node; and
    deleting the intermediate data stage,
       wherein write requests performed by the processing nodes after the mutable data stage has been frozen as the intermediate data stage are fulfilled in relation to a new mutable data stage stored by the shared memory, and
       wherein read requests performed by the processing nodes after the mutable data stage has been frozen as the intermediate data stage and until the updated immutable data stage is provided to each processing node are fulfilled in order in relation to the new mutable data stage, the intermediate data stage, and the immutable data stage.

11. A method comprising:
    receiving, by a processing node, a read request regarding a dataset;
    attempting, by the processing node, to fulfill the read request in relation to a mutable data stage, a sole copy of which is stored by shared memory accessible by the processing node and other processing nodes;
    in response to unsuccessfully fulfilling the read request in relation to the mutable data stage, fulfilling, by the processing node, the read request in relation to an immutable data stage, at least a partial local copy of which is stored by the processing node in local memory thereof;
    in response to unsuccessfully fulfilling the read request in relation to the mutable data stage:
    determining, by the processing node, that another mutable data stage has been frozen as an intermediate data stage for merging with the immutable data stage;
    in response to determining that the other mutable data stage has been frozen in the intermediate data stage, attempting, by the processing node, to fulfill the read request in relation to the intermediate data stage,
       wherein the processing node fulfills the read request in relation to the immutable data stage in response to unsuccessfully fulfilling the read request in relation to the intermediate data stage; and
    returning, by the processing node, a response to the read request as has been fulfilled.

12. The method of claim 11, wherein the immutable data stage stores actively read data of the dataset, and the mutable data stage stores actively read and actively updated data of the dataset.

13. The method of claim 11, wherein the immutable data stage stores a given amount of data in less space than the mutable data stage does,
    wherein the mutable data stage is stored within a lock-free concurrent radix tree, and
    wherein the immutable data stage is stored in a compressed manner using an entropy-encoding scheme.

14. The method of claim 11, wherein the local memory of the processing node is dynamic random-access memory (DRAM) accessible just by the processing node and not by the other processing nodes,
    wherein each processing node accesses data more quickly from the local memory thereof than from the shared memory, and
    wherein the shared memory comprises fabric-attached non-volatile memory (FANVM).

15. A non-transitory computer-readable data storage medium storing program code executable by a management node to:

determine that an immutable data stage stored in shared memory accessible by the management node and each of a plurality of processing nodes and cached at least in a local memory of each processing node is to be updated with a mutable data stage solely stored within the shared memory;

in response to determining that the immutable data stage is to be updated with the mutable data stage, freeze the mutable data stage as an intermediate data stage;

process the intermediate data stage;

update the immutable data stage stored in the shared memory with the processed intermediate data stage; and provide the updated immutable data stage to each processing node.

16. The non-transitory computer-readable data storage medium of claim 15, wherein the program code is executable by the management node to further:

after providing the updated immutable data stage to each processing node, delete the frozen mutable data stage.

17. The non-transitory computer-readable data storage medium of claim 15, wherein after the mutable data stage has been frozen as the intermediate data stage, write requests are fulfilled in relation to a new mutable data stage solely stored within the shared memory, and wherein read requests after the mutable data stage has been frozen as the intermediate data stage and until the updated immutable data stage is provided to each processing node are fulfilled in order of relation to the new mutable data stage, the intermediate data stage, and the immutable data stage.

18. The non-transitory computer-readable data storage medium of claim 15, wherein the immutable data stage stores actively updated data of the dataset, and the mutable data stage stores actively read and actively updated data of the dataset, wherein the immutable data stage stores a given amount of data in less space than the mutable data stage does, wherein the mutable data stage is stored using a lock-free concurrent radix tree that utilizes a filter, and wherein the immutable data stage is stored in a compressed manner using an entropy-encoding scheme.

19. The non-transitory computer-readable data storage medium of claim 15, wherein the local memory of the processing node is dynamic random-access memory (DRAM) accessible just by the processing node and not by the other processing nodes, wherein each processing node accesses data more quickly from the local memory thereof than from the shared memory, and wherein the shared memory comprises fabric-attachable non-volatile memory (FANVM).

* * * * *